(12) United States Patent
Liu et al.

(10) Patent No.: US 11,256,551 B2
(45) Date of Patent: Feb. 22, 2022

(54) BLOCKCHAIN-BASED VIRTUAL RESOURCE ALLOCATION

(71) Applicant: Advanced New Technologies Co., Ltd., Grand Cayman (KY)

(72) Inventors: Lindong Liu, Hangzhou (CN); Jiayin Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/805,162

(22) Filed: Feb. 28, 2020

(65) Prior Publication Data
US 2020/0201684 A1 Jun. 25, 2020

Related U.S. Application Data

(63) Continuation of application No. PCT/CN2020/071082, filed on Jan. 9, 2020.

(30) Foreign Application Priority Data

Apr. 22, 2019 (CN) .......................... 201910324751.1

(51) Int. Cl.
*G06F 9/46* (2006.01)
*G06Q 50/18* (2012.01)
(Continued)

(52) U.S. Cl.
CPC ............ *G06F 9/5077* (2013.01); *G06F 9/466* (2013.01); *G06Q 50/184* (2013.01);
(Continued)

(58) Field of Classification Search
CPC ........ G06F 9/5077; G06F 9/466; G06F 16/27; G06F 16/245; H04L 9/0643;
(Continued)

(56) References Cited

U.S. PATENT DOCUMENTS

2004/0158473 A1* 8/2004 Contractor ............. G06Q 30/02
705/80
2007/0073625 A1* 3/2007 Shelton .................. G06Q 90/00
705/59
(Continued)

FOREIGN PATENT DOCUMENTS

CN 107292777 10/2017
CN 108510412 9/2018
(Continued)

OTHER PUBLICATIONS

Dib et al., "Consortium Blockchains: Overview, Applications and Challenges," International Journal on Advances in Telecommunications, vol. 11 No. 1 and 2, published in 2018, pp. 51-64 (Year: 2018).*

(Continued)

*Primary Examiner* — Richard W. Crandall
(74) *Attorney, Agent, or Firm* — Fish & Richardson P.C.

(57) ABSTRACT

Implementations of this disclosure provide blockchain-based virtual resource allocation. An example method performed by a node device of a blockchain network that operates as an intellectual property management platform includes receiving a target transaction comprising (i) a first quantity of virtual resources for obtaining intellectual property rights for a target object, (ii) an identifier of the target object, and (iii) an identifier of the intellectual property rights, and invoking a smart contract to (i) allocate the first quantity of virtual resources to obtain intellectual property rights for the target object, and (ii) allocate a second quantity of virtual resources to a beneficiary of the intellectual property rights for the target object.

10 Claims, 2 Drawing Sheets

(51) Int. Cl.
*G06F 9/50* (2006.01)
*H04L 9/06* (2006.01)
*H04L 9/32* (2006.01)

(52) U.S. Cl.
CPC .......... *H04L 9/0643* (2013.01); *H04L 9/3213* (2013.01); *H04L 2209/38* (2013.01)

(58) Field of Classification Search
CPC ................ H04L 9/3213; G06Q 50/184; G06Q 30/0645; G06Q 30/0282
USPC .......................................................... 705/310
See application file for complete search history.

(56) References Cited

U.S. PATENT DOCUMENTS

| | | | | |
|---|---|---|---|---|
| 2009/0313665 | A1* | 12/2009 | Rouse | H04N 21/8355 725/93 |
| 2014/0164049 | A1* | 6/2014 | Yakos | G06Q 10/0633 705/7.27 |
| 2017/0193619 | A1 | 7/2017 | Rollins et al. | |
| 2018/0285996 | A1 | 10/2018 | Ma | |
| 2019/0188790 | A1* | 6/2019 | Lovato | G06Q 30/0283 |
| 2019/0220860 | A1* | 7/2019 | Whitmyer, Jr. | G06Q 20/3678 |
| 2019/0318348 | A1* | 10/2019 | Brenner | G06Q 20/1235 |
| 2020/0090143 | A1* | 3/2020 | Iervolino | G06Q 30/0215 |
| 2020/0134585 | A1* | 4/2020 | Xu | G06Q 20/1235 |

FOREIGN PATENT DOCUMENTS

| | | |
|---|---|---|
| CN | 108805707 | 11/2018 |
| CN | 108876334 | 11/2018 |
| CN | 109146545 | 1/2019 |
| CN | 109191289 | 1/2019 |
| CN | 109255600 | 1/2019 |
| CN | 109345212 | 2/2019 |
| CN | 110163483 | 8/2019 |
| TW | M565853 | 8/2018 |

OTHER PUBLICATIONS

Bodo et al., "Blockchain and Smart Contracts: The Missing Link in Contract Licensing?" Oxford University Press, International Journal of Law and Information Technology, Sep. 25, 2018 (Year: 2018).*
Richard, "Consortium Blockchain Explained," Mycryptopedia [online], Nov. 1, 2018. (Year: 2018).*
Bitstamp, [online], archived on: Jan. 1, 2014, available at: < https://web.archive.org/web/20140101231721/https://www.bitstamp.net/ > (Year: 2014).*
Hu, Cherie, "Are Smart Contracts Smart Enough for the Music Industry?" Breaker Mag [online], published on Aug. 29, 2018, available at: < https://breakermag.breaker.io/are-smart-contracts-smart-enough-for-the-music-industry/ > (Year: 2018).*
PCT International Search Report and Written Opinion in International Application No. PCT/CN2020/071082, dated Apr. 15, 2020, 19 pages (with machine translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Dib et al., "Consortium Blockchains: Overview, Applications and Challenges," 2018, International Journal on Advances in Telecommunications, vol. 11 No. 1 and 2, pp. 51-64.

* cited by examiner

BLOCKCHAIN-BASED VIRTUAL RESOURCE ALLOCATION

CROSS-REFERENCE TO RELATED APPLICATIONS

This application is a continuation of PCT Application No. PCT/CN2020/071082, filed on Jan. 9, 2020, which claims priority to Chinese Patent Application No. 201910324751.1, filed on Apr. 22, 2019, and each application is hereby incorporated by reference in its entirety.

TECHNICAL FIELD

The present disclosure relates to the field of data processing technologies, and in particular, to blockchain-based virtual resource allocation methods and apparatuses.

BACKGROUND

The blockchain technology, also referred to as a distributed ledger technology, is an emerging technology in which several computing devices jointly participate in "accounting" and jointly maintain a complete distributed database. Due to its features of decentralization, openness and transparency, participation in database recording by each computing device, and fast data synchronization between computing devices, the blockchain technology has been widely used in many fields.

SUMMARY

In view of the previous description, one or more implementations of the present specification provide blockchain-based virtual resource allocation methods and apparatuses, computer devices, and computer readable storage media.

To achieve the previous objective, one or more implementations of the present specification provide a blockchain-based virtual resource allocation method, where the method is applied to a blockchain network that includes a node device corresponding to an intellectual property management platform and a user client; the intellectual property management platform manages intellectual property rights of at least one object; and the method includes the following: receiving, by a node device of the blockchain, a target transaction, where the target transaction includes a first quantity of virtual resources that are used by the user to obtain target intellectual property rights of a target object; and invoking a smart contract, executing logic declared in the smart contract to allocate virtual resources based on the target intellectual property rights of the target object, and allocating a second quantity of virtual resources to a beneficiary of the intellectual property rights of the target object.

In another shown implementation, the intellectual property rights include one or more of the following: an access right, an access authorization right, a use right, a use authorization right, a transfer right, or a transfer authorization right.

In another shown implementation, the virtual resources include a digital asset circulated on the blockchain, or a digital token corresponding to an off-chain asset.

In another shown implementation, the first quantity is not less than the second quantity.

In another shown implementation, the target transaction further includes an identifier of the target object, or an identifier of the target intellectual property rights.

In another shown implementation, the user client serves as the node device of the blockchain, and the target transaction is sent by the user client to a distributed database of the blockchain.

In another shown implementation, the blockchain is a consortium blockchain, and the node device corresponding to the intellectual property management platform is a consortium member node; and the user client is communicatively connected to the node device corresponding to the intellectual property management platform; and the target transaction is sent by the node device corresponding to the intellectual property management platform to a distributed database of the blockchain.

In another shown implementation, a distributed database of the blockchain stores a target ledger transaction, and the target ledger transaction is used to prove that the beneficiary of the intellectual property rights benefits from an operational permission of the target intellectual property object.

In a shown implementation, the method further includes the following: receiving a target transfer transaction, where the target transfer transaction includes a third quantity of virtual resources that are transferred by the beneficiary of the intellectual property rights to the intellectual property management platform.

In another shown implementation, the method further includes the following: receiving a target gain transaction, where the target gain transaction includes a fourth quantity of virtual resources that are transferred to the beneficiary of the intellectual property rights of the target object based on a gain of the intellectual property rights of the target object; and invoking a smart contract, executing logic declared in the smart contract to allocate virtual resources based on the gain of the intellectual property rights of the target object, and allocating a fifth quantity of virtual resources to the beneficiary of the intellectual property rights of the target object.

Correspondingly, one or more implementations of the present specification further provide a blockchain-based virtual resource allocation apparatus, where the apparatus is applied to a blockchain network that includes a node device corresponding to an intellectual property management platform and a user client; the intellectual property management platform manages intellectual property rights of at least one object; the apparatus is applied to a node device of the blockchain, and includes the following: a receiving unit, configured to receive a target transaction, where the target transaction includes a first quantity of virtual resources that are used by the user to obtain target intellectual property rights of a target object; and an execution unit, configured to invoke a smart contract, execute logic declared in the smart contract to allocate virtual resources based on the target intellectual property rights of the target object, and allocate a second quantity of virtual resources to a beneficiary of the intellectual property rights of the target object.

In another shown implementation, the intellectual property rights include one or more of the following: an access right, an access authorization right, a use right, a use authorization right, a transfer right, or a transfer authorization right.

In another shown implementation, the virtual resources include a digital asset circulated on the blockchain, or a digital token corresponding to an off-chain asset.

In another shown implementation, the first quantity is not less than the second quantity.

In another shown implementation, the target transaction further includes an identifier of the target object, or an identifier of the target intellectual property rights.

In another shown implementation, the user client serves as the node device of the blockchain, and the target transaction is sent by the user client to a distributed database of the blockchain.

In another shown implementation, the blockchain is a consortium blockchain, and the node device corresponding to the intellectual property management platform is a consortium member node; and the user client is communicatively connected to the node device corresponding to the intellectual property management platform; and the target transaction is sent by the node device corresponding to the intellectual property management platform to a distributed database of the blockchain.

In another shown implementation, a distributed database of the blockchain stores a target ledger transaction, and the target ledger transaction is used to prove that the beneficiary of the intellectual property rights benefits from an operational permission of the target intellectual property object.

In a shown implementation, the receiving unit is further configured to receive a target transfer transaction, where the target transfer transaction includes a third quantity of virtual resources that are transferred by the beneficiary of the intellectual property rights to the intellectual property management platform.

In another shown implementation, the receiving unit is further configured to receive a target gain transaction, where the target gain transaction includes a fourth quantity of virtual resources that are transferred to the beneficiary of the intellectual property rights of the target object based on a gain of the intellectual property rights of the target object; and the execution unit is further configured to invoke a smart contract, execute logic declared in the smart contract to allocate virtual resources based on the gain of the intellectual property rights of the target object, and allocate a fifth quantity of virtual resources to the beneficiary of the intellectual property rights of the target object.

Correspondingly, one or more implementations of the present specification further provide a computer device, including a memory and a processor, where the memory stores a computer program that can be executed by the processor; and the processor executes the computer program to perform the virtual resource allocation method that is performed by the node device of the blockchain.

Correspondingly, one or more implementations of the present specification further provide a computer readable storage medium, where the computer readable storage medium stores a computer program, and the computer program is executed by a processor to perform the virtual resource allocation method that is performed by the node device of the blockchain.

As can be seen from the previous technical solutions, according to the blockchain-based virtual resource allocation method and apparatus, the computer device, and the computer readable storage medium provided in the present specification, virtual resources can be conveniently and quickly allocated to the beneficiary corresponding to the target intellectual property object by using the smart contract based on the consensus mechanism of the blockchain.

DESCRIPTION OF IMPLEMENTATIONS

Figure 1:
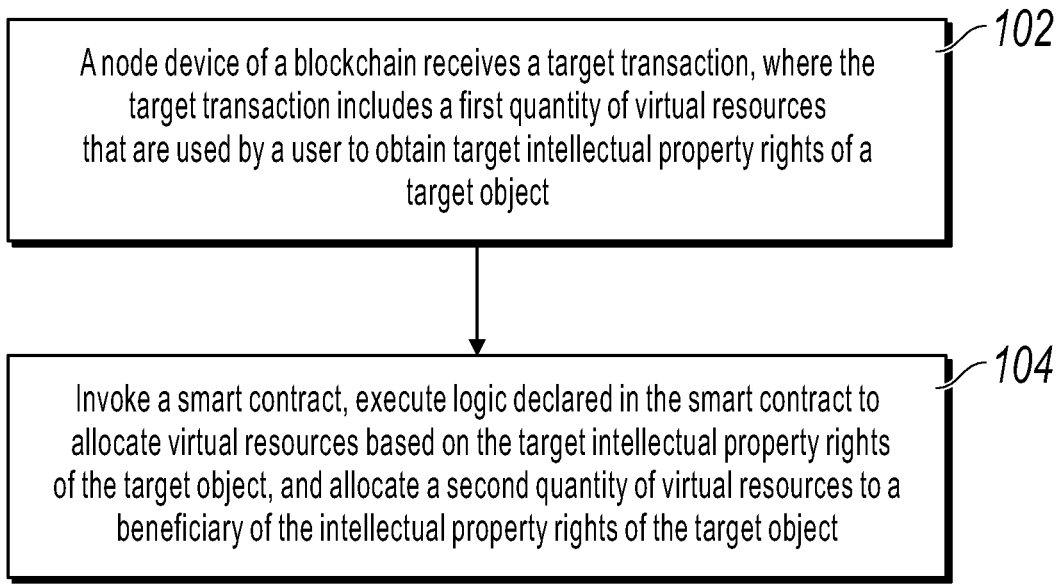
FIG. 1 is a schematic flowchart illustrating a blockchain-based virtual resource allocation method, according to an implementation of the present specification.

Example implementations are described in detail here, and examples of the example implementations are presented in the accompanying drawings. When the following description relates to the accompanying drawings, unless specified otherwise, same numbers in different accompanying drawings represent same or similar elements. Example implementations described in the following do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that the steps of the corresponding methods are not necessarily performed in the order shown and described in the present specification in other implementations. In some other implementations, the methods can include more or less steps than those described in the present specification. In addition, a single step described in the present specification can be decomposed into multiple steps in other implementations for description; and multiple steps described in the present specification can be combined into a single step for description in other implementations.

A conventional intellectual property sharing platform generally includes libraries related to specific intellectual property objects, such as an expression library, an icon library, a documentation library, etc., and provides corresponding services for users, for example, authorizing users to download or use. Consumer users usually make payment on an annual basis or purchase a whole library. Because content of intellectual property rights in the previously described libraries is usually provided by multiple producers, in the conventional platform service model, the allocation mechanism for the producers (or beneficiaries) of intellectual property rights is usually unfair. Some producers of intellectual property rights provide less intellectual property rights, but the intellectual property rights are frequently used and purchased, and their value is not reflected.

To alleviate the previously described problems, one or more implementations of the present specification provide a blockchain-based virtual resource allocation method, where the method is applied to a blockchain network that includes a node device corresponding to an intellectual property management platform and a user client; and the intellectual property management platform manages intellectual property rights of at least one object.

The blockchain network described in one or more implementations of the present specification can be a P2P network system that is formed by various node devices by using a consensus mechanism and has a distributed data storage structure. The data in the blockchain is distributed in various blocks interconnected in terms of time, and a current block includes a data digest of a previous block. In addition, full backup of the data of all or some nodes is achieved based on different consensus mechanisms (e.g., POW, POS, DPOS, PBFT, etc.). It is well known to a person skilled in the art that, because the blockchain network system runs under the corresponding consensus mechanism, the data recorded in the blockchain database can hardly be tampered with by any node. For example, for the blockchain using the POW consensus mechanism, the existing data can only be tampered by attacks that have at least 51% of the computation power of the whole network. Therefore, the blockchain system has incomparable features of data security and tamper-resistance over other centralized database systems. Therefore, the data recorded in the distributed database of the blockchain cannot be attacked or tampered with, thereby ensuring authenticity and reliability of the data information whose certificate has been stored in the distributed database of the blockchain.

Examples of the blockchain network can include a public blockchain network, a private blockchain network, and a consortium blockchain network. The public blockchain network is open to all entities that use the P2P network and participate in the consensus process. The private blockchain network is provided to a specific entity that centrally controls read and write permissions. The consortium blockchain network is provided to a selected entity group (which controls the consensus process), and includes an access control layer. The implementations of the present specification can be implemented in any suitable type of blockchain network.

The node (or node device) described in one or more implementations of the present specification is a node that joins the blockchain by complying with a corresponding node protocol and installing a node protocol program. As known to a person skilled in the art, a node device with full backup of data in the distributed database of the blockchain is usually referred to as a full node, and a node device with partial backup of data (such as only the data of a block header) in the distributed database of the blockchain is usually referred to as a lightweight node. In one or more implementations of the present specification, a node type of the node device corresponding to the previously described intellectual property management platform is not limited.

The intellectual property management platform described in one or more implementations of the present specification includes an operational platform for enforcing intellectual property rights such as an access right, a use right, or a transfer right for at least one object provided by an intellectual property provider. The previous object refers to a carrier that intellectual property rights are attached to, such as a text, a picture, an audio, a video, or any combination of the previously described items. The text can be used to carry literary works, patents, practical document templates, etc. The picture can carry various designs, artistic works, trademarks, etc. The audio and video can carry musical works, movie and television series works, other performance works, etc. A platform user can obtain intellectual property rights of a target object on the platform. The intellectual property rights can include one or more of the following: an access right, an access authorization right, a use right, a use authorization right, a transfer right, or a transfer authorization right.

In one or more implementations provided in the present specification, a platform user entity joins the previously described blockchain network by running a client installer program at a terminal. The client installer program can be an installer program of the node device of the blockchain. Correspondingly, the user client also serves as a node device of the blockchain. When backing up a copy of the distributed database of the blockchain, the user client initiates a data acquisition request to its adjacent node device (such as the node device corresponding to the previously described intellectual property management platform). Alternatively, the previously described client installer program can be an access-controlled blockchain user client program that is connected to a consortium member node device (such as the node device corresponding to the previously described intellectual property management platform) in the consortium blockchain. Correspondingly, because the client has no permission to directly access the distributed database of the blockchain, the client is usually not used as a node of the previously described blockchain. Therefore, the client needs to request data that the client has permission to obtain from one or more consortium member nodes connected to the client. Whether the previously described user client is a node device of the previously described blockchain is not limited in the present specification. As described above, regardless of whether the previously described client serves as a node device of the blockchain or serves as a user-side device of a consortium member node, the client can obtain data stored in the distributed database of the blockchain or send data to the distributed database of the blockchain by using one or more node devices in the blockchain.

As shown in FIG. 1, in an implementation of a blockchain-based virtual resource allocation method provided in the present specification, the method includes the following:

Step 102: A node device of the blockchain receives a target transaction, where the target transaction includes a first quantity of virtual resources that are used by a user to obtain intellectual property rights of a target object.

The transaction described in one or more implementations of the present specification is a piece of data that is created by a node device of the blockchain and needs to be eventually published to a distributed database of the blockchain. Transactions in the blockchain are classified into transactions in a narrow sense and transactions in a broad sense. A transaction in a narrow sense refers to a value transfer that is published by a user to the blockchain. For example, in a conventional bitcoin blockchain network, a transaction can be a funds transfer initiated by a user in the blockchain. A transaction in a broad sense refers to a piece of business data with a business intent that is published by a user entity to the blockchain by using a node. The target transaction described in the present implementation can not only include business data related to the target intellectual property rights of the target object to be obtained by the user, such as an identification code of the target object, an identification code of the target intellectual property rights (a code used to identify the type of the target intellectual property rights), etc., but also include fees used to pay for the intellectual property rights of the target object—a first quantity of virtual resources.

The virtual resources described in one or more implementations of the present specification can include digital assets circulated on the blockchain, such as bitcoin, Ethercoin, or similar digital currencies defined and circulated on the blockchain. The virtual resources can further include assets outside the blockchain, such as cash, securities, coupons, real estates, other off-chain assets, and corresponding digital tokens, etc. A person skilled in the art can design a specific representation form of the previously described virtual resources depending on an actual business scenario demand, which is not limited in the present disclosure.

To further provide the context of the implementations of the present specification, in a blockchain network, applications can be developed, tested, and deployed for execution within the blockchain network. Example applications can include but are not limited to smart contracts. The smart contract can be described as digital representation of real-world legal contracts with contractual terms that affect relevant parties. The smart contract is implemented, stored, updated (as needed), and executed within the blockchain network. Contract parties (e.g., a buyer and a seller) associated with the smart contract are represented as nodes in the blockchain network.

In some examples, the smart contract can store data that can be used to record information, facts, associations, balances, and any other information needed to implement contract execution logic. The smart contract can be described as a computer executable program that includes functions. An instance of the smart contract can be created and a function can be invoked to execute the logic of the smart contract.

In terms of technology, the smart contract can be implemented based on an object and an object-oriented class. For example, the terms and components of the smart contract can be represented as objects that implement application processing for the smart contract. The smart contract (or an object in the smart contract) can invoke another smart contract (or an object in the same smart contract) like other object-oriented objects. For example, invoking performed by an object can be invoking that creates, updates, deletes, propagates, or communicates with an object of another class. Invoking between objects can be implemented by a function, a method, an application programming interface (API), or other invoking mechanisms. For example, a first object can invoke a function to create a second object.

Therefore, based on the previous description of the smart contract, the target transaction described in one or more implementations of the present specification is a transaction of invoking the smart contract, and can further include an address, a function name, or other parameters of the invoked smart contract, and details are omitted here for simplicity. It is worthwhile to note that, if the smart contract invoked by the target transaction is only used to allocate virtual resources for particular intellectual property rights of a certain particular object, the content of the target transaction can exclude an identifier of the target object or an identifier of the intellectual property rights of the target object.

It is worthwhile to note that, an identity of a sender of the previously described target transaction is not limited in the present implementation. As described above, when serving as a node of the blockchain, the user client can directly send the target transaction to the blockchain. After blockchain consensus verification on the target transaction succeeds, the target transaction is recorded into the distributed database of the blockchain. In another shown implementation, the blockchain described in the implementation is a consortium blockchain, and the node device corresponding to the previous intellectual property management platform is a consortium member node. Then the user client serves as a user end of the intellectual property management platform, and is communicatively connected to the node device corresponding to the intellectual property management platform. The user sends the target intellectual property rights of the target object to be obtained to the intellectual property management platform, and pays corresponding virtual resources (a quantity of the virtual resources is not limited and can be not less than the previously described first quantity). The node device corresponding to the intellectual property management platform organizes and generates the previously described target transaction, and sends the target transaction to the blockchain.

Compared with the implementation in which the node device of the platform collects the information about the user client and then sends the target transaction to the blockchain, the implementation in which the user client directly sends the target transaction to the blockchain has a simplified process and provides stronger data authenticity. However, the hardware demand of the user client is high, and the data processing without using the platform may waste the space of the distributed database of the blockchain due to sending of some invalid data. A person skilled in the art can set up a blockchain model (such as a consortium blockchain model) that matches the business model depending on an actual business demand, and allocate corresponding participant permissions to the user client.

Step 104: Invoke a smart contract, execute logic declared in the smart contract to allocate virtual resources based on the target intellectual property rights of the target object, and allocate a second quantity of virtual resources to a beneficiary of the intellectual property rights of the target object.

In the previous implementation, the beneficiary of the intellectual property rights of the target object can be more than one party. For example, the beneficiary of the intellectual property rights of the target object can include a provider of the target object, another beneficiary having an income distribution agreement with the provider of the target object, and a platform for operating the intellectual property rights of the target object as a party of the previous intellectual property management platform and having the rights of the beneficiary of the intellectual property rights of the target object, etc.

The previously described smart contract is based on an agreement on income distribution among all the beneficiaries of the target intellectual property rights of the target object. The logic for allocating virtual resources to the target intellectual property rights of the target object is written, and deployed to the blockchain through the consensus verification on the smart contract performed by the node device on the blockchain. Therefore, compared with the conventional method in which the intellectual property management platform independently formulates and executes the logic for allocating the income of intellectual property rights, the allocation logic of the virtual resource allocation method provided in the present specification is more transparent and open. A person skilled in the art should know that the smart contract can be executed at any time based on the invoking request, therefore, the execution efficiency of virtual resource allocation is improved. In an implementation, the consensus mechanism of the blockchain can include the consensus content of the logic rule declared by the previously described smart contract, and the implementation ensures that the allocation logic of the virtual resource allocation method declared by the smart contract that passes the consensus verification of multiple node devices on the blockchain is more equitable and fair.

An identity of a deployment party of the previously described smart contract is not limited in the present specification. The smart contract can be formulated and deployed by the previously described intellectual property management platform or deployed by other industry regulatory authorities based on industry rules. In a shown implementation, the previously described smart contract account obtains the first quantity of virtual resources based on the target transaction, and allocates the second quantity of virtual resources to the beneficiary of the intellectual property rights of the target object based on the virtual resource allocation logic. To ensure profitability of the deployment party of the smart contract, the first quantity can be not less than the second quantity.

In another shown implementation, after the second quantity of virtual resources is allocated to the beneficiary of the intellectual property rights of the target object, to assist the beneficiary of the intellectual property rights in converting the obtained virtual resources into the needed types of resources, for example, converting the digital currencies circulated on the blockchain into RMB assets, the intellectual property management platform can further provide corresponding resource exchange services. Correspondingly, the beneficiary of the intellectual property rights of the target object needs to transfer the quantity of virtual resources to be exchanged to the intellectual property management platform on the blockchain. In other words, in the present implementation, the previous virtual resource allocation method can further include the following: receiving a target transfer transaction, where the target transfer transaction includes a third quantity of virtual resources that are transferred by the beneficiary of the intellectual property rights to the intellectual property management platform.

Based on one or more of the previously described implementations, the conventional whole selling model of the object library can be excluded. Through the smart contract deployed on the blockchain, the corresponding virtual resource allocation logic is set for the target intellectual property rights of the target object, so that the beneficiary of the intellectual property rights of the target object can obtain a more fair quantity of virtual resources, effectively increasing enthusiasm of the beneficiary (or provider) of the intellectual property rights of the target object.

In another shown implementation, to ensure that the beneficiary of the intellectual property rights has the right to benefit from the target intellectual property rights of the target object, the distributed database of the blockchain stores a target ledger transaction, and the target ledger transaction is used to prove that the beneficiary of the intellectual property rights can benefit from the target intellectual property rights of the target object. The target ledger transaction can be a transaction in which the node device corresponding to the beneficiary of the intellectual property rights uploads the target object that the node device has the beneficial right to the distributed database of the blockchain, or can include proof data that the beneficiary of the intellectual property rights sends the target object to the previous intellectual property management platform, etc., which is not limited here.

In an existing business model, in addition to the right to benefit from the intellectual property rights of the target object, the beneficiary of the intellectual property rights further has the right to receive a user's reward based on the target object, such as a user's reward to the author based on the target works. To further ensure that the previously described reward or other gain behavior of the intellectual property rights can stimulate the beneficiary of the intellectual property rights, in another shown implementation of the present specification, the virtual resource allocation method further includes the following: receiving a target gain transaction, where the target gain transaction includes a fourth quantity of virtual resources that are transferred to the beneficiary of the intellectual property rights of the target object based on a gain of the intellectual property rights of the target object; and invoking a smart contract, executing logic declared in the smart contract to allocate virtual resources based on the gain of the intellectual property rights of the target object, and allocating a fifth quantity of virtual resources to the beneficiary of the intellectual property rights of the target object. The previously described gain of the intellectual property rights of the target object includes a reward, a profit, a dividend, etc. generated based on the intellectual property rights of the target object. In an implementation, the fourth quantity is not less than the fifth quantity.

Corresponding to the previous process implementation, an implementation of the present specification further provides a blockchain-based virtual resource allocation apparatus 20. The apparatus 20 can be implemented by software, or can be implemented by hardware or a combination of software and hardware. For example, the apparatus is implemented by software. A logical apparatus is formed when a central process unit (CPU) of a device where the apparatus is located reads a corresponding computer program instruction into the memory for running. In terms of hardware, in addition to the CPU, storage, and memory shown in FIG. 3, the device in which the virtual resource allocation apparatus is located generally further includes other hardware such as a chip for transmitting and receiving wireless signals, and/or other hardware such as a board for implementing network communication functions.

Figure 2:
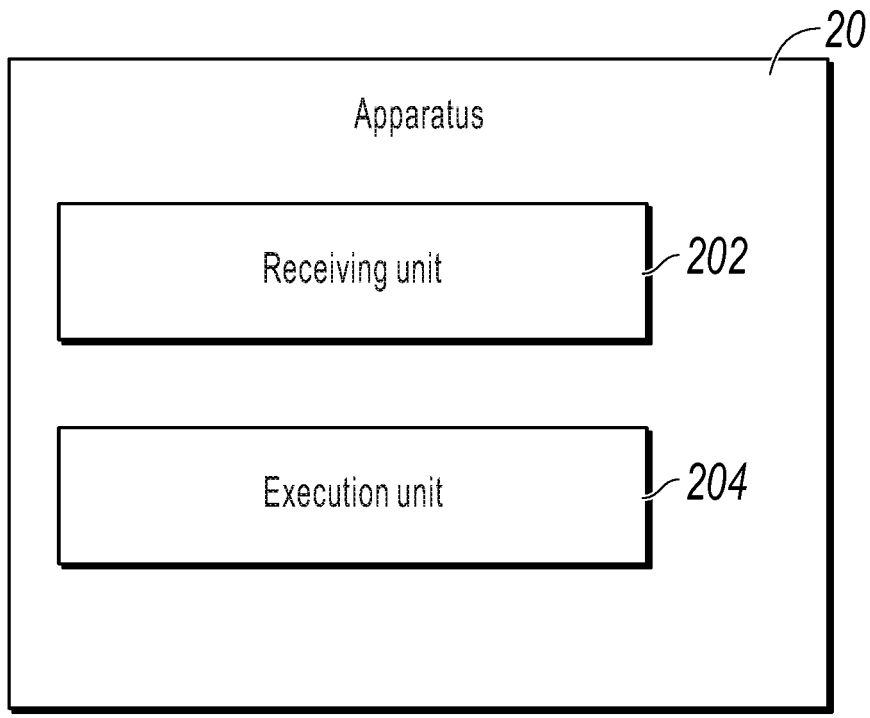
FIG. 2 is a schematic diagram illustrating a blockchain-based virtual resource allocation apparatus applied to a node device of a blockchain, according to an implementation of the present specification.

As shown in FIG. 2, the present specification further provides a blockchain-based virtual resource allocation apparatus 20, where the apparatus 20 is applied to a blockchain network that includes a node device corresponding to an intellectual property management platform and a user client; the intellectual property management platform manages intellectual property rights of at least one object; the apparatus 20 is applied to a node device of the blockchain, and includes the following: a receiving unit 202, configured to receive a target transaction, where the target transaction includes a first quantity of virtual resources that are used by the user to obtain target intellectual property rights of a target object; and an execution unit 204, configured to invoke a smart contract, execute logic declared in the smart contract to allocate virtual resources based on the target intellectual property rights of the target object, and allocate a second quantity of virtual resources to a beneficiary of the intellectual property rights of the target object.

In another shown implementation, the intellectual property rights include one or more of the following: an access right, an access authorization right, a use right, a use authorization right, a transfer right, or a transfer authorization right.

In another shown implementation, the virtual resources include a digital asset circulated on the blockchain, or a digital token corresponding to an off-chain asset.

In another shown implementation, the first quantity is not less than the second quantity.

In another shown implementation, the target transaction further includes an identifier of the target object or an identifier of the target intellectual property rights.

In another shown implementation, the user client serves as the node device of the blockchain, and the target transaction is sent by the user client to a distributed database of the blockchain.

In another shown implementation, the blockchain is a consortium blockchain, and the node device corresponding to the intellectual property management platform is a consortium member node; and the user client is communicatively connected to the node device corresponding to the intellectual property management platform; and the target transaction is sent by the node device corresponding to the intellectual property management platform to a distributed database of the blockchain.

In another shown implementation, a distributed database of the blockchain stores a target ledger transaction, and the target ledger transaction is used to prove that the beneficiary of the intellectual property rights benefits from an operational permission of the target intellectual property object.

In a shown implementation, the receiving unit is further configured to receive a target transfer transaction, where the target transfer transaction includes a third quantity of virtual resources that are transferred by the beneficiary of the intellectual property rights to the intellectual property management platform.

In another shown implementation, the receiving unit 202 is further configured to receive a target gain transaction, where the target gain transaction includes a fourth quantity of virtual resources that are transferred to the beneficiary of the intellectual property rights of the target object based on a gain of the intellectual property rights of the target object; and the execution unit 204 is further configured to invoke a smart contract, execute logic declared in the smart contract to allocate virtual resources based on the gain of the intellectual property rights of the target object, and allocate a fifth quantity of virtual resources to the beneficiary of the intellectual property rights of the target object.

For an implementation process of functions and roles of each unit in the apparatus 20, references can be made to an implementation process of corresponding steps in the previous virtual resource allocation method performed by the node device of the blockchain. For related parts, references can be made to related descriptions in the method implementation, and details are omitted here for simplicity.

The previously described apparatus implementation is merely an example. The units described as separate parts can or cannot be physically separate, and parts displayed as units can or cannot be physical modules, can be located in one position, or can be distributed on multiple network modules. Some or all of the units or modules can be selected depending on an actual demand to achieve the objectives of the solutions of the present specification. A person of ordinary skill in the art can understand and implement the implementations of the present specification without creative efforts.

The apparatus, unit, or module illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Figure 3:
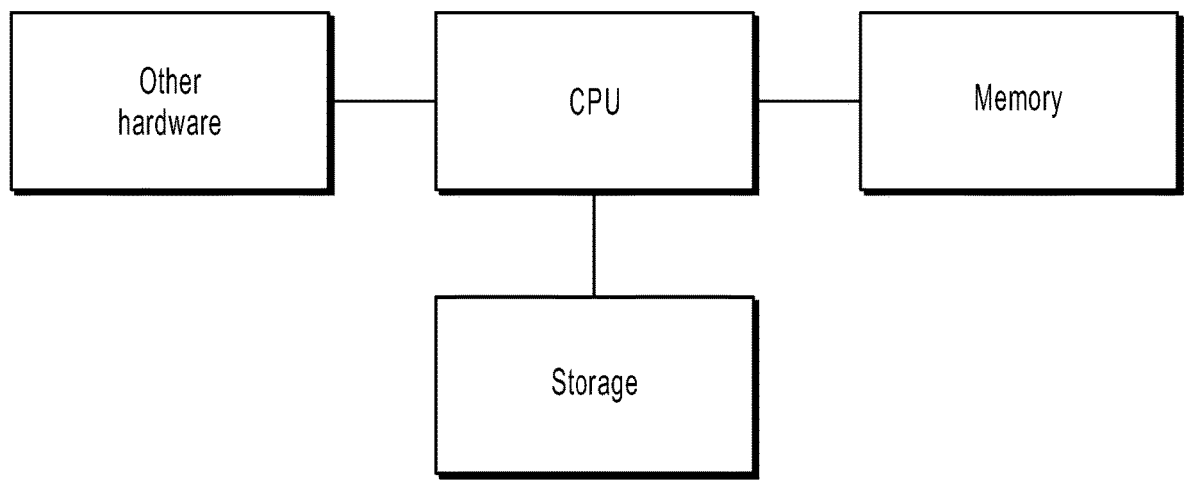
FIG. 3 is a diagram illustrating a hardware structure for running a blockchain-based virtual resource allocation apparatus, according to an implementation of the present specification.

Corresponding to the previous method implementation, the present specification further provides a computer device. As shown in FIG. 3, the computer device includes a memory and a processor. The memory stores a computer program that can be executed by the processor. The processor executes the stored computer program to perform the steps of the previous virtual resource allocation method performed by the node device of the blockchain in the implementation of the present specification. For detailed descriptions of the steps of the previous virtual resource allocation method performed by the node device of the blockchain, references can be made to the previous content, and details are omitted here for simplicity.

Corresponding to the previous method implementation, an implementation of the present specification further provides a computer readable storage medium. The storage medium stores a computer program, and the computer program is executed by a processor to perform the steps of the previous virtual resource allocation method performed by the node device of the blockchain in the implementation of the present specification. For detailed descriptions of the steps of the previous virtual resource allocation method performed by the node device of the blockchain, references can be made to the previous content, and details are omitted here for simplicity.

The previous descriptions are merely example implementations of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method, comprising:

receiving, by a node device of a blockchain network that operates as an intellectual property management platform, and from a client device, a target transaction, wherein the target transaction comprises (i) a first quantity of virtual resources for obtaining an intellectual property right for a target object, (ii) a first identification code that specifies the target object, and (iii) a second identification code that specifies a type of the intellectual property right to be obtained for the target object, wherein the blockchain network is a consortium blockchain network, the node device is a consortium member node of the intellectual property management platform, and the client device is communicatively connected to the node device;

sending, by the node device of the blockchain network, the target transaction to a distributed database of the blockchain network;

invoking, by the node device of the blockchain network, a first smart contract that executes logic declared in the first smart contract to (i) allocate the first quantity of virtual resources to obtain the intellectual property right for the target object, and (ii) allocate a second quantity of virtual resources to a beneficiary of the intellectual property right for the target object, the second quantity of virtual resources being less than or equal to the first quantity of virtual resources for obtaining the intellectual property right for the target object, wherein the first smart contract is based on a resource distribution agreement of the beneficiary of the intellectual property right, wherein the logic declared in the first smart contract for allocating virtual resources is deployed to the blockchain network through consensus verification on the first smart contract; and after the second quantity of virtual resources has been allocated, (i) receiving, by the node device of the blockchain network, a target transfer transaction that comprises a third quantity of virtual resources from the beneficiary of the intellectual property right for the target object, and (ii) performing an exchange of the third quantity of virtual resources for a national currency;

receiving, by the node device of the blockchain network, a target gain transaction, wherein the target gain transaction comprises a fourth quantity of virtual resources based on a dividend generated from the intellectual property right obtained for the target object; and invoking, by the node device of the blockchain network, a second smart contract that executes logic declared in the second smart contract to allocate a fifth quantity of virtual resources to the beneficiary of the intellectual property right of the target object, the fifth quantity of virtual resources being less than or equal to the fourth quantity of virtual resources.

2. The computer-implemented method of claim 1, wherein the intellectual property right comprises one or more of an access right, an access authorization right, a use right, a use authorization right, a transfer right, and a transfer authorization right.

3. The computer-implemented method of claim 1, wherein the virtual resources comprise a digital asset circulated on the blockchain network, or a digital token corresponding to an off-chain asset.

4. The computer-implemented method of claim 1, wherein the distributed database of the blockchain network stores a target ledger transaction that proves that the beneficiary of the intellectual property right for the target object benefits from an operational permission of the target object.

5. A non-transitory, computer-readable medium storing one or more instructions executable by a computer system, comprising a node device of a blockchain network, to perform operations comprising:

receiving, by the node device of the blockchain network that operates as an intellectual property management platform, and from a client device, a target transaction, wherein the target transaction comprises (i) a first quantity of virtual resources for obtaining an intellectual property right for a target object, (ii) a first identification code that specifies the target object, and (iii) a second identification code that specifies a type of the intellectual property right to be obtained for the target object, wherein the blockchain network is a consortium blockchain network, the node device is a consortium member node of the intellectual property management platform, and the client device is communicatively connected to the node device;

sending, by the node device of the blockchain network, the target transaction to a distributed database of the blockchain network;

invoking, by the node device of the blockchain network, a first smart contract that executes logic declared in the first smart contract to (i) allocate the first quantity of virtual resources to obtain the intellectual property right for the target object, and (ii) allocate a second quantity of virtual resources to a beneficiary of the intellectual property right for the target object, the second quantity of virtual resources being less than or equal to the first quantity of virtual resources for obtaining the intellectual property right for the target object, wherein the first smart contract is based on a resource distribution agreement of the beneficiary of the intellectual property right, wherein the logic declared in the first smart contract for allocating virtual resources is deployed to the blockchain network through consensus verification on the first smart contract; and after the second quantity of virtual resources has been allocated, (i) receiving, by the node device of the blockchain network, a target transfer transaction that comprises a third quantity of virtual resources from the beneficiary of the intellectual property right for the target object, and (ii) performing an exchange of the third quantity of virtual resources for a national currency;

receiving, by the node device of the blockchain network, a target gain transaction, wherein the target gain transaction comprises a fourth quantity of virtual resources based on a dividend generated from the intellectual property right obtained for the target object; and invoking, by the node device of the blockchain network, a second smart contract that executes logic declared in the second smart contract to allocate a fifth quantity of virtual resources to the beneficiary of the intellectual property right of the target object, the fifth quantity of virtual resources being less than or equal to the fourth quantity of virtual resources.

6. The computer-readable medium of claim 5, wherein the virtual resources comprise a digital asset circulated on the blockchain network, or a digital token corresponding to an off-chain asset.

7. The computer-readable medium of claim 5, wherein the distributed database of the blockchain network stores a target ledger transaction that proves that the beneficiary of the intellectual property right for the target object benefits from an operational permission of the target object.

8. A computer-implemented system, comprising:
one or more computers, comprising a node device of a blockchain network; and
one or more computer memory devices interoperably coupled with the one or more computers and having tangible, non-transitory, machine-readable media storing one or more instructions that, when executed by the one or more computers, perform one or more operations comprising:
receiving, by the node device of the blockchain network that operates as an intellectual property management platform, and from a client device, a target transaction, wherein the target transaction comprises (i) a first quantity of virtual resources for obtaining an intellectual property right for a target object, (ii) a first identification code that specifies the target object, and (iii) a second identification code that specifies a type of the intellectual property right to be obtained for the target object, wherein the blockchain network is a consortium blockchain network, the node device is a consortium member node of the intellectual property management platform, and the client device is communicatively connected to the node device;
sending, by the node device of the blockchain network, the target transaction to a distributed database of the blockchain network;
invoking, by the node device of the blockchain network, a first smart contract that executes logic declared in the first smart contract to (i) allocate the first quantity of virtual resources to obtain the intellectual property right for the target object, and (ii) allocate a second quantity of virtual resources to a beneficiary of the intellectual property right for the target object, the second quantity of virtual resources being less than or equal to the first quantity of virtual resources for obtaining the intellectual property right for the target object, wherein the first smart contract is based on a resource distribution agreement of the beneficiary of the intellectual property right, wherein the logic declared in the first smart contract for allocating virtual resources is deployed to the blockchain network through consensus verification on the first smart contract; and
after the second quantity of virtual resources has been allocated, (i) receiving, by the node device of the blockchain network, a target transfer transaction that comprises a third quantity of virtual resources from the beneficiary of the intellectual property right for the target object, and (ii) performing an exchange of the third quantity of virtual resources for a national currency;
receiving, by the node device of the blockchain network, a target gain transaction, wherein the target gain transaction comprises a fourth quantity of virtual resources based on a dividend generated from the intellectual property right obtained for the target object; and
invoking, by the node device of the blockchain network, a second smart contract that executes logic declared in the second smart contract to allocate a fifth quantity of virtual resources to the beneficiary of the intellectual property right of the target object, the fifth quantity of virtual resources being less than or equal to the fourth quantity of virtual resources.

9. The computer-implemented system of claim 8, wherein the virtual resources comprise a digital asset circulated on the blockchain network, or a digital token corresponding to an off-chain asset.

10. The computer-implemented system of claim 8, wherein the distributed database of the blockchain network stores a target ledger transaction that proves that the beneficiary of the intellectual property right for the target object benefits from an operational permission of the target object.

* * * * *